July 20, 1926.
D. C. PRINCE
1,593,356
SYSTEM OF ELECTRICAL DISTRIBUTION
Filed March 14, 1924
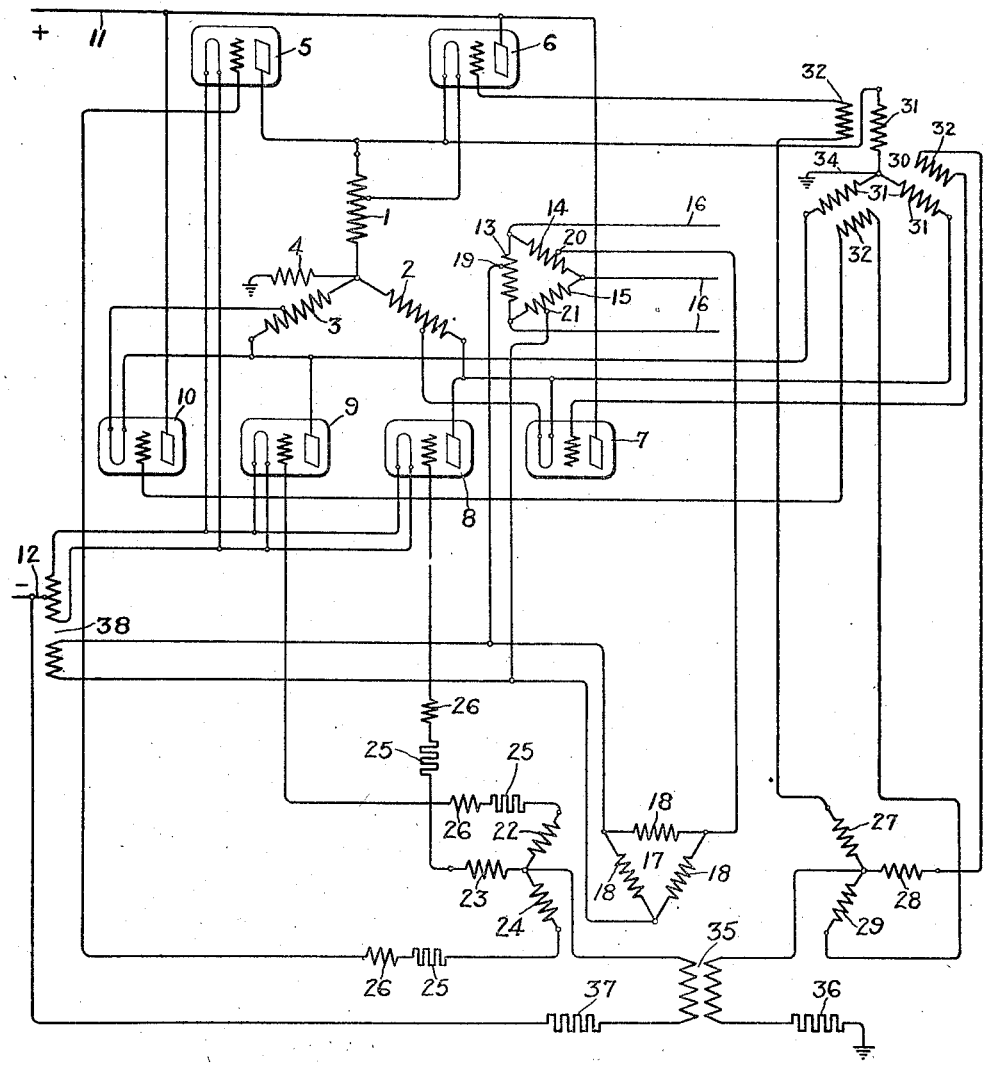
Inventor:
David C. Prince:
by *Alexander F. Lunt*
His Attorney.

Patented July 20, 1926.

1,593,356

UNITED STATES PATENT OFFICE.

DAVID C. PRINCE, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

Application filed March 14, 1924. Serial No. 699,386.

My present invention relates to systems of electrical distribution, particularly systems for converting direct current to alternating current.

The object of my invention is to provide a convenient and effective means for controlling the flow of current from a direct current source, by means of electron discharge devices or valves, through the primary windings of a transformer in such a way that alternating current may be supplied from the secondary windings of the transformer.

The novel features which I believe to be characteristic of my invention are set forth with particularity in the appended claims. The invention itself however, both as to its organization and method of operation will best be understood by reference to the following description taken in connection with the accompanying drawing in which I have indicated diagrammatically one circuit organization whereby my invention may be carried into effect.

I have indicated in the drawing an electrical distribution system which comprises a transformer having three phase primary windings 1, 2 and 3 connected in Y, and grounded through an inductance 4. The ungrounded terminals of the primary windings are connected through valves 5 to 10 inclusive to a source of direct current power which may be connected to the supply leads 11 and 12. The valves 5, 8 and 9 have their cathodes connected to the negative terminal of the direct current supply and their anodes connected to the ungrounded terminals of windings 1, 2 and 3 respectively, while valves 6, 7 and 10 have their anodes connected to the positive supply conductors 11 and their cathodes connected to the ungrounded terminals of windings 1, 2 and 3 respectively. The secondary windings 13, 14 and 15, which are connected in delta, are inductively connected to windings 1, 2 and 3, and alternating current is supplied from these windings to the distribution conductors 16.

By reason of the opposite connection of a pair of valves to each primary terminal, current may be caused to flow through each primary winding in either direction. In order to accomplish this it is necessary that the grids of the valves be excited in the proper phase and with the right potential to stop the flow of current through each valve or permit the flow of current at the proper time. In the case of valves 5, 8 and 9, the cathodes of which are connected to the negative supply conductor 12, the necessary exciting potential for the grids is readily obtained. For these valves a grid transformer 17 is provided, the primary windings 18 of this transformer being connected to taps 19, 20, 21 on the secondary windings 13, 14, 15. Secondary windings 22, 23, 24 of the grid transformer 17 are connected in Y and each of these secondary windings is connected through a resistance 25 and inductance 26 to the grid of one of the valves 5, 8 and 9. Another set of secondary windings 27, 28 and 29 are also provided, the potentials induced in these windings being impressed upon the grids of valves 6, 7 and 10. In the case of these valves, the cathodes being connected to the ungrounded terminals of the primary windings 1, 2 and 3, the control is not so simple, as the potentials of the cathodes oscillate by reason of their connection to the ungrounded terminals of the primary windings 1, 2 and 3. To compensate for the oscillating potentials of the cathodes a three phase transformer 30, is provided, the primaries 31 of this transformer each having one terminal connected to an ungrounded terminal of the primaries 1, 2 and 3, and the other terminals grounded at 34. The secondaries 32 of transformer 30 are connected in series with the secondaries 27, 28 and 29, so that the resultant potential impressed upon the grids of valves 6, 7 and 10, is a combination of the two potentials derived from the secondary windings 13, 14 and 15, and primary windings 1, 2 and 3.

The neutral point of windings 22, 23 and 24 is connected through one winding of transformer 35 and resistance 37 to the negative line 12, which is connected to the cathodes of valves 5, 8 and 9. The neutral point of windings 27, 28 and 29 is connected through the other winding of transformer 35 and resistance 36 to ground.

The principle of operation is that the grids of valves 6, 7 and 10 must have the same potentials relative to their respective cathodes as the grids of valves 5, 8 and 9 except for 180° phase rotation. The windings 27, 28 and 29 associated with transformer 35 and resistance 36 give the proper voltages except that the potentials are referred to ground instead of to the respective cathodes. It therefore remains to impress upon each grid an additional voltage equal to that between the corresponding cathode and ground. This voltage is supplied by windings 31 and 32 of the three-phase transformer 30. The instantaneous potential differences between the cathode and ground are impressed upon primary windings 31. The corresponding induced voltages in secondary windings 32 are added to the grid voltages derived from transformer 17.

In order to preserve the symmetry of the grid excitation resistances 25 and inductances 26 are provided to equal the resistance and reactance of windings 32.

The function of transformer 35 is to hold constant the current drawn by each group of grids. This transformer might be replaced by two separate reactances without changing the operation of the set.

The use of a transformer 30 enables grid voltages to be generated at a common point (including bias) and impressed upon the grids of valves between the cathodes of which there are alternating potentials which may depart considerably from sine form and vary with load.

The cathodes of valves 6, 7 and 10 may be heated by connecting them across a suitable number of turns of the primary windings 1, 2 and 3 as indicated in the drawing. The cathodes of valves 5, 8 and 9 may all be connected in parallel and heated by means of current from a transformer 38 the primary of which receives current from one phase of the primary of transformer 17 as indicated.

What I claim as new and desire to secure by Letters Patent of the United States, is:—

1. The combination in a system of electrical distribution, of a transformer having primary and secondary windings, a source of direct current, a pair of valves oppositely connected to supply current from said source to each primary winding, means for controlling the flow of current from said source through one of each pair of valves by potentials derived from the secondary windings of said transformer and means for controlling the flow of current from said source through the second of each pair of valves by potentials derived from both the primary and secondary windings.

2. The combination in a system of electrical distribution of a transformer having primary and secondary windings, a source of direct current, a pair of electron discharge valves for supplying current from said source to each primary winding, one valve of each pair having a cathode connected to a terminal of a primary winding, and the second valve of each pair having an anode connected to the same terminal of a primary winding, means for controlling the flow of current from said source through the valves having their anodes connected to the primary windings by potentials derived from the secondary windings of said transformed and means for controlling the flow of current from said source through the valves having their cathodes connected to the primary windings by potentials derived from both primary and secondary windings.

3. The combination in a system of electrical distribution of a transformer having primary and secondary windings a source of direct current, a pair of three electrode electron discharge valves for supplying current from said source to each primary winding of said transformer, said valves being so connected that during the operation thereof the potential of the cathode of one valve of each pair remains substantially fixed with respect to earth while the potential of the cathode of the second valve of each pair varies with respect to earth potential, and means for supplying to the grids of all of said valves potentials which vary similarly with respect to the potentials of their respective cathodes.

4. The combination in a system of electrical distribution of a transformer having primary and secondary windings, a source of direct current, a pair of electron discharge valves for supplying current from said source to each primary winding of said transformer, said valves being so connected that during the operation thereof the potential of the cathode of one valve of each pair remains substantially fixed with respect to earth while the potential of the cathode of the second valve of each pair varies with respect to earth potential, and means for producing similar current variations through all of said valves.

5. The combination in a system of electrical distribution of a transformer having primary and secondary windings, a source of direct current, a pair of electron discharge valves for supplying current from said source to each primary winding of said transformer, said valves being so connected that during the operation thereof the potential of the cathode of one valve of each pair remains substantially fixed with respect to earth while the potential of the cathode of the second valve of each pair varies with respect to earth potential, means for controlling the flow of current through the first mentioned valve of each pair by potentials derived from the secondary windings, and means for controlling the flow of current through the second mentioned valve of each pair by potentials derived from both the primary and secondary windings.

6. The combination in a system of electrical distribution of a transformer having primary and secondary windings, a source of direct current, means for supplying current from said source to said primary windings comprising a set of electron discharge valves having their cathodes connected to the terminals of said primary windings, a second set of valves having their anodes connected to the same terminals of said primary windings, means for controlling the current through the said second set of valves by potentials derived from said secondary windings, means for controlling the current through the first set of valves by potentials derived from both the primary and secondary windings.

7. The combination in a system of electrical distribution of a transformer having primary and secondary windings, a source of direct current, means for supplying current from said source to said primary windings comprising two sets of electron discharge valves oppositely connected to said windings, means for controlling the currents through one set of valves by potentials derived from said secondary windings and means for controlling the currents through the second set of valves by means of potentials derived from both the primary and secondary windings.

8. The combination in a system of electrical distribution of a transformer having primary and secondary windings, a source of direct current, means for supplying currents to said primary windings from said source comprising two sets of electron discharge valves oppositely connected to said primary windings, a second transformer having its primary windings connected to selected points in the secondary windings of the first transformer, the second transformer having two sets of secondary windings, one set of which is connected to supply potentials for controlling the currents through one set of valves and the second set of which is connected to supply potentials for controlling the currents through the second set of valves and a third transformer having its primary windings connected to the primary windings of the first transformer and its secondary windings connected to supply potentials for controlling the currents through the second set of valves.

9. The combination in a system of electrical distribution of a transformer having primary and secondary windings, a source of direct current, means for supplying currents to said primary windings from said source comprising two sets of electron discharge valves oppositely connected to said primary windings, a second transformer having its primary windings connected to selected points in the secondary winding of the first transformer, the second transformer having two sets of secondary windings, one set of which is connected to supply potentials for controlling the currents through one set of valves and the second set of which is connected to supply potentials for controlling the currents through the second set of valves, and a third transformer having its primary windings connected to the primary windings of the first transformer and its secondary windings connected to supply potentials for controlling the currents through the second set of valves, the second set of secondary windings of the second transformer and the secondaries of the third transformer being serially connected.

In witness whereof, I have hereunto set my hand this 13th day of March, 1924.

DAVID C. PRINCE.

DISCLAIMER 1,593,356.—*David C. Prince*, Schenectady, N. Y. SYSTEM OF ELECTRICAL DISTRIBUTION. Patent dated July 20, 1926. Disclaimer filed May 20, 1931, by the assignee, *General Electric Company*.

Therefore, enters this disclaimer to claim 4 of said patent which is in the following words:—

"4. The combination in a system of electrical distribution of a transformer having primary and secondary windings, a source of direct current, a pair of electron discharge valves for supplying current from said source to each primary winding of said transformer, said valves being so connected that during the operation thereof the potential of the cathode of one valve of each pair remains substantially fixed with respect to earth while the potential of the cathode of the second valve of each pair varies with respect to earth potential, and means for producing similar current variations through all of said valves."

[*Official Gazette June 16, 1931.*]